March 11, 1941.  H. W. SHOESMITH  2,234,879
HANDCART
Filed Sept. 11, 1939
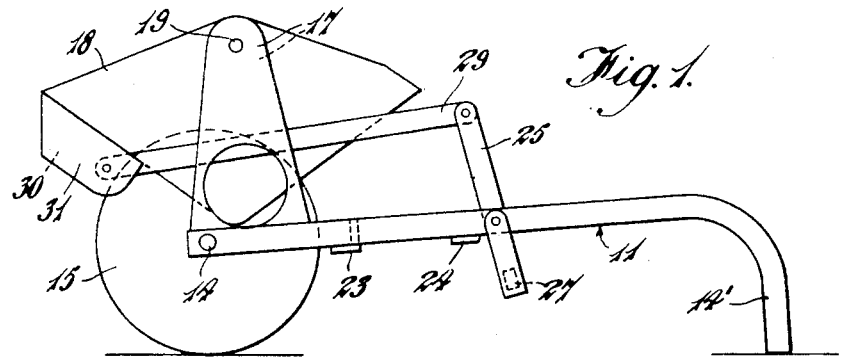
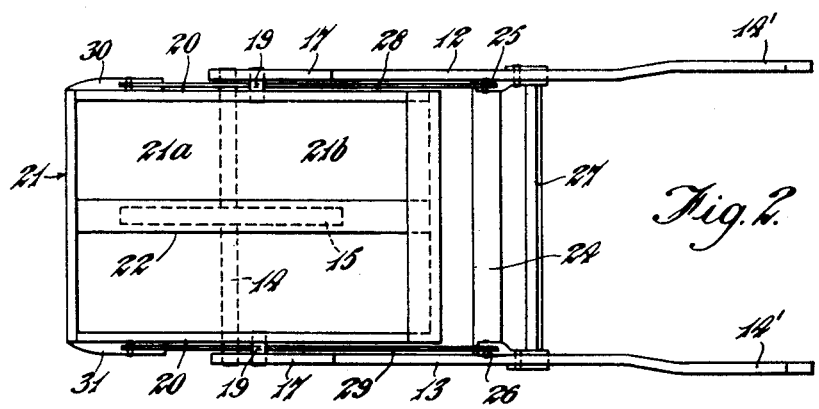
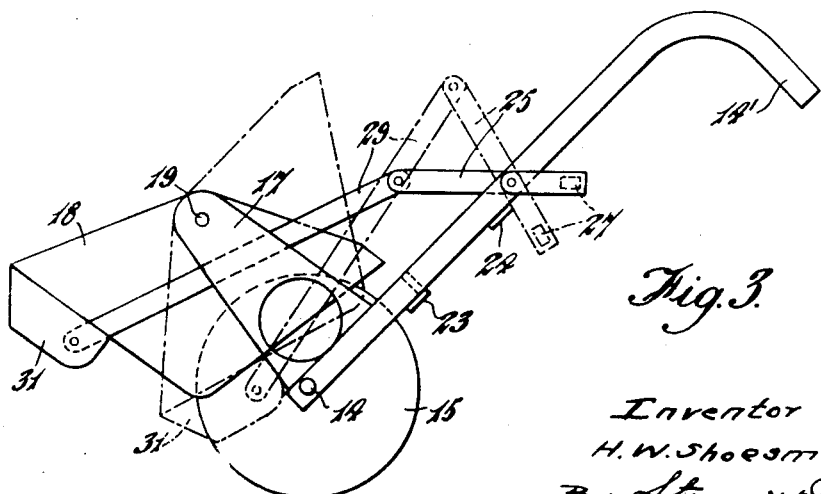
Inventor
H. W. Shoesmith
By: Stevens & Davis
Attys.

Patented Mar. 11, 1941

2,234,879

UNITED STATES PATENT OFFICE 2,234,879

HANDCART

Hugh Waters Shoesmith, Mortimer, South Africa

Application September 11, 1939, Serial No. 294,389
In Great Britain July 28, 1938

5 Claims. (Cl. 298—3)

This invention relates to handcarts which, among others, may take the form of a wheelbarrow.

An object of the invention is to provide a wheelbarrow which can very easily be loaded and which, when being trundled, has the weight satisfactorily distributed. Another object of the invention is to provide such a wheelbarrow the contents of which can easily be tipped out.

The invention is illustrated by the accompanying drawing, of which one embodiment in the form of a wheelbarrow is shown in Figures 1 to 3, Figure 1 being a side elevation showing the wheelbarrow in one position, Figure 2 being a corresponding plan view, and Figure 3 being a side elevation showing the wheelbarrow in another position.

Referring to Figures 1 to 3, the wheelbarrow comprises a chassis 11 having two parallel side members 12 and 13. The side members 12 and 13 have journalled therein near their forward ends a transversely disposed ground wheel axle 14 on which a ground wheel 15 is fast midway of the length of the axle. At their opposite ends, the side members 12 and 13 carry handles 14 which form curved extensions of said side members. The sizes of the parts are such that when the side members are supported by the ground wheel 15 and by the tips of the handles 14, said side members are disposed more or less horizontally, as shown in Figure 1. The side members 12 and 13 carry at their forward ends upstanding brackets 17. These brackets serve to support a carrier or hopper 18 which is pivotally connected to the brackets by short co-axial stub axles 19 carried by the brackets 17. The carrier comprises flat side walls 20 which are united by a two-part bottom wall 21, the parts of which indicated at 21a and 21b converge downwardly and meet along a line substantially midway of the length of the carrier. The distance between the axes of the stub axles 19 and the axis of the ground wheel axle 14 is little greater than the depth of the carrier 18 and the carrier 18 has a central longitudinal partition 22 which is hollowed from the underneath to accommodate the part of the ground wheel 15 disposed above the side members 12 and 13.

The side members 12 and 13 are united by a scraper bar 23 disposed closely spaced from the rear part of the wheel 15 and by a further transverse bar 24.

A pair of levers 25 and 26 are pivoted intermediately of their lengths to the side members 12 and 13 respectively at positions along the latter a short distance in rear of the bar 24. The connections between the levers and the side members may be forked for added strength and to resist bending of the pivot pins. The lower ends of the levers 25 and 26 are rigidly connected by a foot tread 27 and the upper ends of the levers 25 and 26 are respectively connected by links 28 and 29 to brackets 30 and 31 respectively carried by the forward part 21a of the bottom wall 21 of the carrier.

The carrier or hopper 18 and its associated parts are so arranged that the hopper at all times tends to remain with its open side uppermost so that as the handles 14 are raised to the trundling position shown in Figure 3, the hopper will of itself remain as shown with its open side horizontal. The hopper can very easily be rocked in an anti-clockwise direction to the position indicated by broken lines in Figures 3 in order that the contents of the hopper shall be tipped out. The rocking of the hopper is brought about by applying downward foot pressure on the foot tread, it being easy to apply this pressure while still holding the handles by both hands. It will be noted that in the rocked position both bottom wall parts 21a and 21b slope downwardly to the forward edge of the hopper so that the entire contents are free to slide out.

If desired the wheelbarrow can be placed in a resting position in which the whole is supported by the ground wheel and by the brackets 30 and 31 of the hopper. In this position the hopper can very easily be loaded.

It is to be understood that a handcart in accordance with the invention may be constructed from wood or metal or from a combination of these materials. In view of the fact that the single wheel is carried on a comparatively long axle, the bearings being at the extremities, there may be mounted within the wheel recess of the wheelbarrow shown in Figures 1 to 3 rollers against which the wheel bears giving additional support and taking some of the strain off the wheel axle. However the wheel axle may carry two ground wheels one on each side of the carrier in which case the hollow partition would not be necessary.

What I claim is:

1. A handcart comprising a chassis with a pair of side members, an axle carried by the side members at one end of the latter, a ground wheel on the axle between the side members, a pair of parallel brackets upstanding from and carried by the side members at said one end, handle means at the other end of the side members by which the chassis is wheeled about, said handle means forming curved extensions of the side members, a carrier having two side walls united by a two-part bottom wall the parts of which converge downwardly, pivots connecting the sides of the carrier to the brackets respectively about an axis parallel with the axle, the distance between the pivots and the axle being less than the depth of the carrier and the radius of the wheel combined and the carrier having a central partition parallel with the sides of the carrier and hollow from the underneath to accommodate part of the ground wheel.

2. A handcart according to claim 1, wherein the side members of the chassis are united by a transverse bar disposed closely spaced from the periphery of the ground wheel so that said transverse bar forms a scraper.

3. In a handcart according to claim 1, a pair of levers pivoted intermediately of their lengths to the side members of the chassis respectively, links connecting the upper ends respectively of the levers to the corresponding sides of the carrier at that end of the latter remote from the handles, and a foot tread uniting the lower ends of said levers, the axis of the pivots connecting the carrier to the brackets being in a plane containing the centre of gravity of the carrier so that the latter tends to remain with its bottom wall symmetrical about the vertical, whilst downward pressure on the foot tread is transmitted through the levers and links to the carrier to rock the latter upwardly and forwardly at its rear end to cause the contents to be tipped out.

4. A handcart comprising a chassis with a pair of side members carrying a ground wheel axle at one end thereof, a pair of parallel brackets upstanding from and carried by the side members at said one end, handle means at the other end of the side members by which the chassis is wheeled about, a carrier, pivots connecting the carrier to the brackets about an axis parallel with the axle, a pair of levers pivoted intermediately of their lengths to the side members of the chassis respectively, links connecting the upper ends respectively of the levers to the corresponding sides of the carrier at that end of the latter remote from the handles, and a foot tread uniting the lower ends of said levers, the arrangement being such that when the parts are in the positions they occupy when the handcart is wheeled about, the carrier hangs with its open side uppermost and, upon downward movement of the foot tread, is adapted to be rocked upwardly and forwardly at its rear end to tip out the contents of the carrier.

5. A handcart according to claim 4, wherein the handle means comprise down-turned extensions of the side members of the chassis such that when the side members are supported by the tips of the handles and by the ground wheel said side members are disposed horizontally.

HUGH WATERS SHOESMITH.